UNITED STATES PATENT OFFICE.

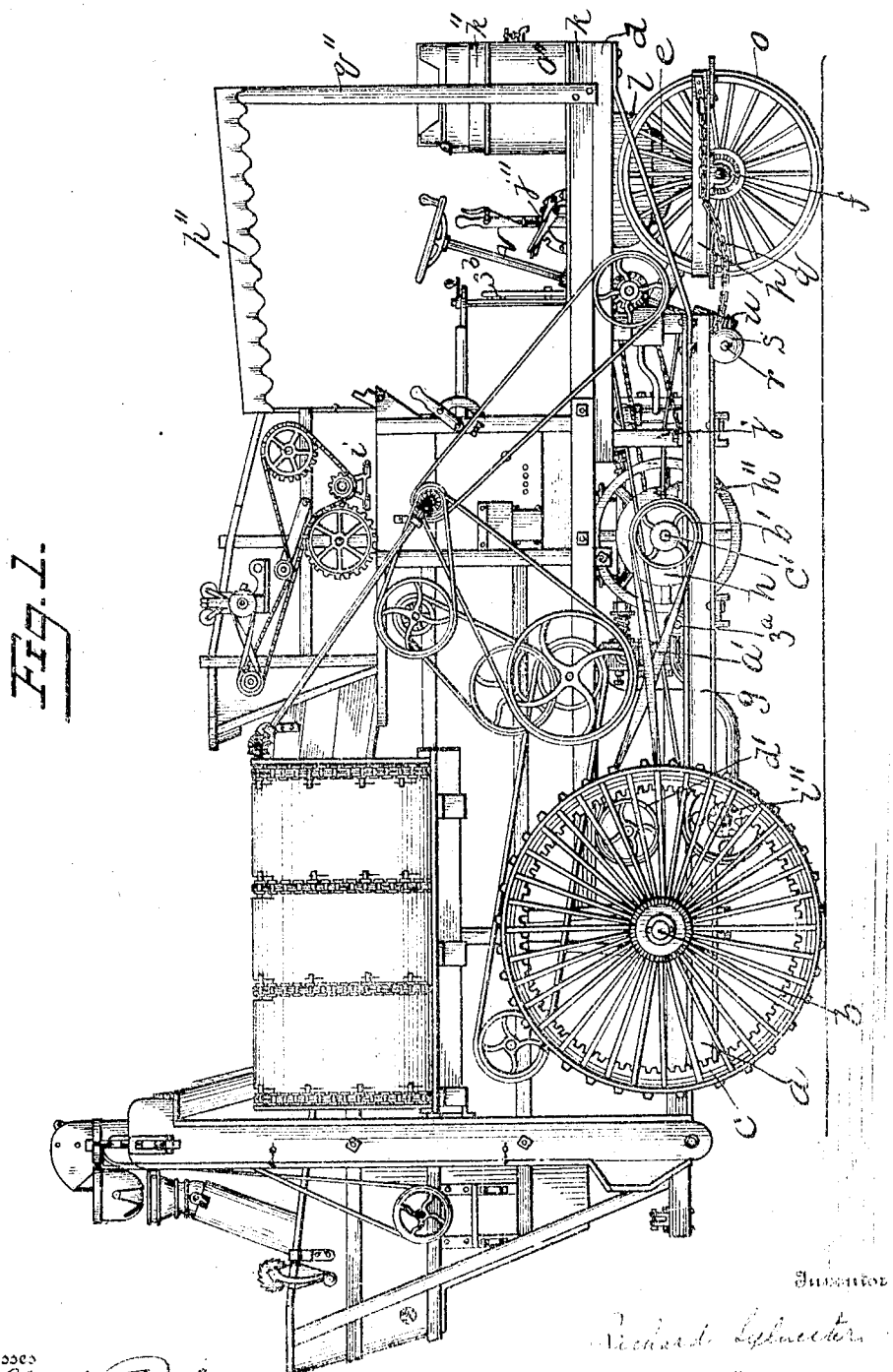

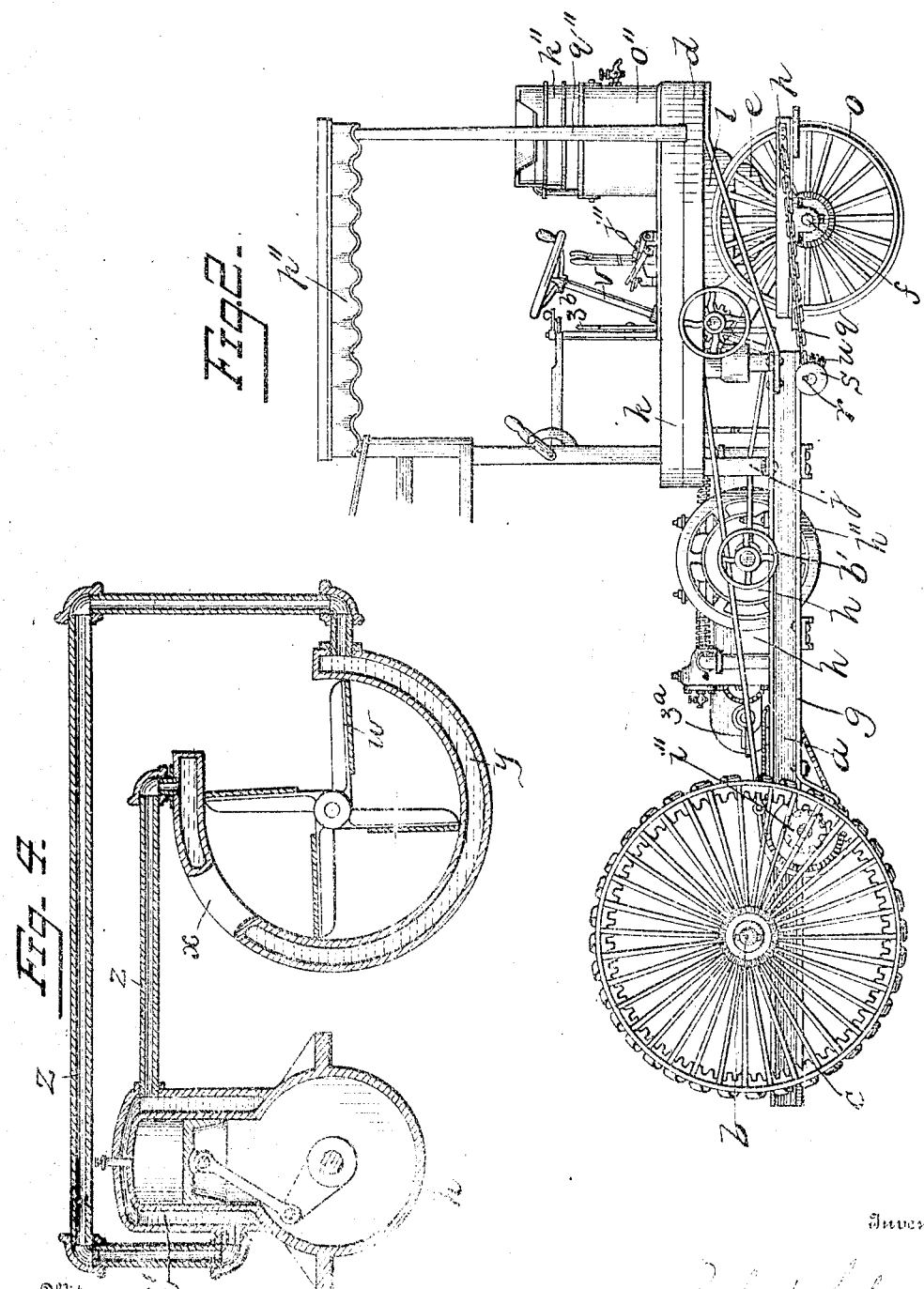

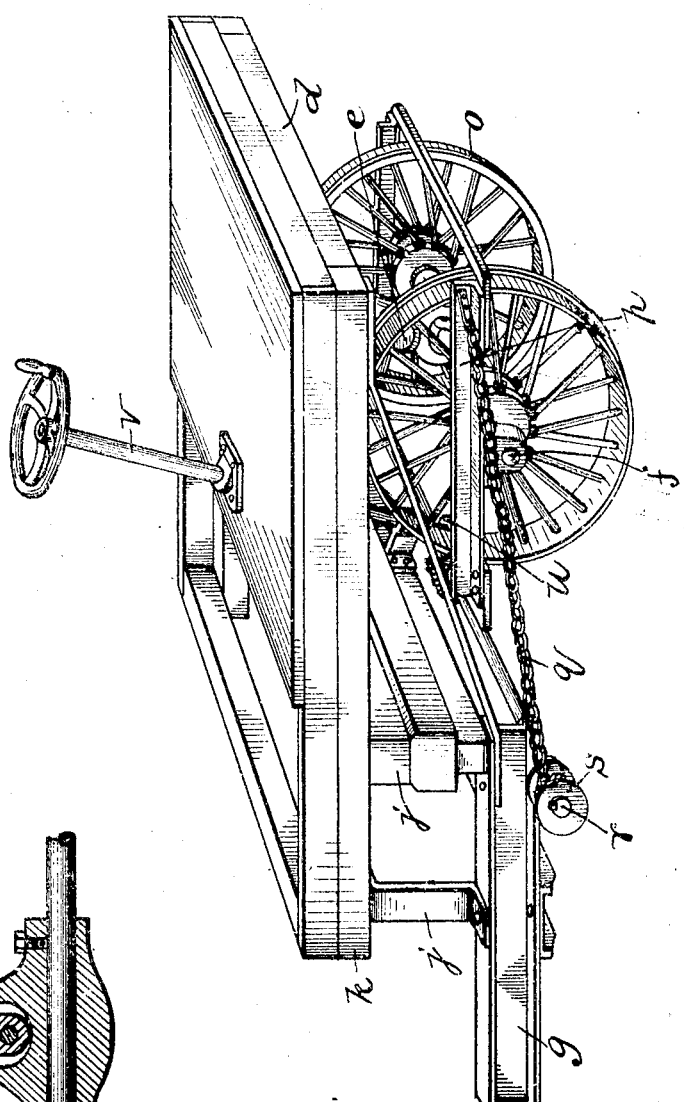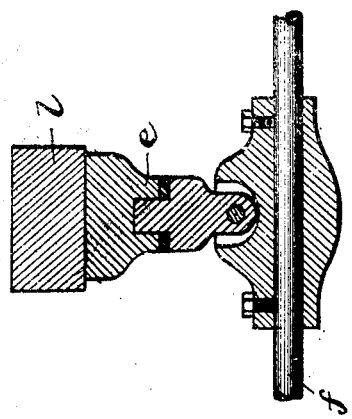

RICHARD SYLVESTER, OF LINDSAY, ONTARIO, CANADA.

TRACTION-TRUCK.

No. 913,783.  Specification of Letters Patent.  Patented March 2, 1909.

Application filed February 4, 1907. Serial No. 355,737.

*To all whom it may concern:*

Be it known that I, RICHARD SYLVESTER, of the town of Lindsay, in the county of Victoria and Province of Ontario, Canada, have invented certain new and useful Improvements in Traction-Trucks; and I hereby declare that the following is a full, clear, and exact description of the same.

This invention relates to certain new and useful improvements in agricultural machines, having a traction truck to which can be detachably connected the separator of a threshing machine, or which can be employed to draw a gang of plows, drag a series of cultivators or seeding machines, carry a harvester binder, or perform any other power work ordinarily required in farming operations, the traction truck being provided with a motive mechanism which can be employed to propel the traction truck and actuate the operating parts of the machine propelled thereby.

The invention further relates to the peculiar construction and arrangement of the main and fore carriages constituting the essential parts of the traction truck, and to the peculiar manner in which the steering wheels are connected to the fore carriage to compensate for any variation in the level of the path over which the traction truck is traveling, and to the controlling mechanism for the steering wheels whereby they will be quickly sensitive to any desired change of direction.

The invention further relates to the water cooling means for the motor, which consists of a fan carried by the traction truck and forming an inseparable part of the motor employed to propel the traction truck and actuate the driven parts of the apparatus and a water casing also carried by the traction truck inclosing or partially inclosing the fan casing, and suitably connected with the water space of the water jacket of the motor whereby a circulation of water may be maintained from the water jacket to the water casing from which the heat units or calories are extracted by the circulation of the air caused during the revolution of the fan.

For a full understanding of the invention reference is to be had to the following description and to the accompanying drawings in which;

Figure 1 is a side elevation of a traction truck combined with a threshing machine showing the relative position of the principal parts. Fig. 2 is a detail view of the traction truck on a larger scale than in Fig. 1. Fig. 3 is a view of the fore carriage. Fig. 3ª is a detail view of the swivel bearing for the fore carriage axle. Fig. 4 is a view, on a larger scale than the preceding views, showing the fan and water cooler, in section, and connected by circulating pipes with the water jacket of the motor.

Like characters of reference refer to like parts throughout the specification and drawings.

The traction truck may be described as consisting of, a main carriage $a$ supported from the traction wheels $c$ by the main carriage axle $b$, and a fore carriage $d$ rigidly secured to the front end of the main carriage, and supported from the steering wheels $o$ by the fore carriage axle $f$ and a double swiveled bracket $e$.

The main carriage $a$ is provided with two side beams $g$ located below the plane of the arms of the main carriage axle to carry the motor $h$, and the motor mechanism $h''$ below the plane of the longitudinal axis of the main carriage axle $b$, so that the weight of the traction truck and its motor mechanism will be below the center of gravity of the apparatus to assist in counterbalancing the weight of the load carried by the traction truck.

The fore carriage $d$ is rigidly connected to the main carriage $a$ by uprights $j$ fastened to the side beams $g$ and to the framing of the fore carriage platform $k$, to hold the fore carriage platform $k$ in a plane parallel with the side beams $g$ and at a higher elevation than the plane of the motor $h$ and thus provide for the location of the steering wheels $o$ below it and within the plane of its sides with sufficient clearance between the parts of the fore carriage platform and the top of the steering wheels to permit of the free movement of the latter.

The steering wheels $o$ are mounted on the arms of the fore carriage axle $f$ which is connected with the sill $l$ of the fore carriage platform by a swivel bracket $e$ which permits the fore carriage axle $f$ to swing radially in an horizontal or substantially horizontal plane when guiding the direction of the movement of the traction truck and to rock vertically so that the wheels can adapt themselves to the surface over which the traction truck is traveling. By this means it is possible to readily control the direction of the movement of the traction truck under favorable and unfavorable conditions, and to maintain the equilibrium of the parts of the traction truck and the apparatus carried thereby and thus minimize its vibrating and twisting movements originating from the unevenness of the surface on which the wheels are traveling.

Connected to the arms of the fore carriage axle $f$ on the outer side of the steering wheels $o$ are the side bars $p$ of the steering frame. The steering frame embraces the steering wheels preferably above the plane of the axle with sufficient clearance between itself and the steering wheels to allow of the free revolution of the latter. Connected to the side bars of the steering frame in front of the arms of the fore carriage axle $f$ are steering chains $q$ adapted to be wound on the winding drums $s$ actuated by the worm shaft $r$. The worm shaft $r$ is journaled in bearings connected to the side beams $g$ of the main carriage, and is actuated by the worm gear $u$ driven by the steering mast $v$. The revolution of the steering mast in either direction actuates the worm shaft of the winding drums, to simultaneously wind one of the steering chains and unwind the other when controlling the direction of the steering wheels and thus cause a quick responsive action of the fore carriage axle, owing to the leverage exerted by the steering chains resulting from their attachment to the steering frame at the sides of the steering wheels in front of the fore carriage axle. This construction of the steering mechanism renders the steering wheels extremely sensitive to any desired change of direction and renders it possible to readily control the direction of the traction truck under favorable and unfavorable conditions.

The traction truck is employed to carry and support the separating mechanism of a threshing outfit which may be described as consisting of a separator $i$ detachably supported at its front end on the rear end of the fore carriage platform $h$ and at its rear end on the side beams $g$ of the main carriage, with the weight of the separator distributed approximately evenly on each side of the main carriage axle, so that the main carriage axle can carry it and relieve the fore carriage of the major part of the weight of the apparatus.

The motor $h$ is located on the main carriage $a$ below the front end of the separator $i$ and in rear of the fore carriage $d$ and is rigidly supported by the frame work carried by the side beams $g$ of the main carriage $a$. Carried by the main carriage $a$ and forming an essential part of the motor mechanism is a fan $w$, inclosed by a fan casing $x$ and surrounding or partially surrounding the fan casing $x$ is a water cooler $y$ connected with the water jacket $h'$ of the motor by circulating pipes $z$, so that the water may continuously flow from the water jacket of the motor to the water cooling casing of the fan and then return to the former. The fan $w$ is preferably driven from the motor by a drive belt $a'$, passing around the drive pulley $b'$ on the motor shaft $c'$ and around a driven pulley $d'$ on the fan shaft. The revolution of the fan creates an induced air current which beats against the inner face of the water cooling casing of the fan, which may be either separate from but in contact with, or may form part of, the casing of the water cooler, and the air currents as they beat against it absorb the calories or heat units radiated from the water circulating through the water cooler and reduce the temperature of the water before it returns to the water jacket of the motor. By this means it is possible to maintain a low temperature for the engine parts with the employment of a small volume of water.

The fan $w$ is positioned on the traction truck so that it can be employed as a fan for the separator to drive the induced air currents with the absorbed calories or heat units through the separating mechanism to dry or assist in the drying of the grain and straw passing through it.

The motive mechanism of the traction truck transmits by a suitable transmission gear $i''$ propelling motion to the traction wheels controlled by a suitable arrangement of friction clutches $3^a$ and levers $3^b$. This gear may be so arranged that it can be operated independently of the separating mechanism or in unison therewith, or the propelling mechanism can be stopped during the actuation of the separating mechanism, or the separating mechanism can be stopped during the actuation of the propelling mechanism.

As shown in the drawings the fore carriage platform extends forwardly from the front end of the separator and has sufficient accommodation for the motor controlling mechanism $j''$, storage tanks $k''$, tool chest $o''$ and accommodation for the driver of the apparatus and one or more assistants who are protected by a canopy $p''$ supported by the standards $q''$ connected to the fore carriage and to the front of the separator and who may be further protected by side curtains connected to the canopy.

Having thus fully described my invention what I claim as new and desire to secure by Letters Patent is:

1. An agricultural machine comprising a traction truck having a fore carriage, a steering axle revolubly connected to the fore carriage, steering wheels mounted on the steering axle, a steering frame connected to the steering axle on the outer sides of the steering wheels, and projecting in front of the steering axle, and a controlling mechanism for the steering frame comprising a connecting means attached to the sides thereof in front of the steering axle, and means for actuating the connecting means.

2. An agricultural machine comprising a traction, truck having a fore carriage, a steering axle revolubly connected to the fore carriage, steering wheels mounted on the steering axle, a steering frame connected to the steering axle, on the outer sides of the steering wheels and projecting in front of the steering axle and a controlling mechanism for the steering frame, comprising a connecting means attached to the sides thereof in front of the steering axle, and means for actuating the connecting means, comprising a revoluble shaft, drums mounted thereon, and a steering mast to rotate the shaft and drums.

3. The hereinbefore described apparatus comprising a traction truck, having traction and steering wheels and an agricultural machine detachably connected to the traction truck and a motor carried by the traction truck to actuate the traction wheels and agricultural machine, said agricultural machine being so disposed upon the truck, that its weight will be evenly distributed on both sides of the axle of the traction wheels.

4. The hereinbefore described apparatus comprising a traction truck having traction and steering wheels and a threshing separator mechanism, detachably connected to the traction truck, and a motor carried by the traction truck to actuate the traction truck and threshing separator mechanism together at the same time or each independently controlled by means of levers actuating the same conveniently located to the man steering the motor truck.

Lindsay, December 31st, A. D. 1906.

RICHARD SYLVESTER.

Signed in the presence of—
L. E. SYLVESTER,
MADGE L. FLETT.